United States Patent [19]

Lyyra

[11] Patent Number: 4,583,632

[45] Date of Patent: Apr. 22, 1986

[54] FEEDING ASSEMBLY FOR FEEDING BOOKS OR BOOK BLANKS AT REGULAR INTERVALS ONTO A CONVEYOR BELT

[76] Inventor: Hannu P. K. Lyyra, Rintamamiehentie 1 A 11, 06100 Porvoo 10, Finland

[21] Appl. No.: 589,960

[22] Filed: Mar. 15, 1984

[30] Foreign Application Priority Data

Mar. 31, 1983 [FI] Finland ................................ 831111

[51] Int. Cl.[4] ........................................... B65G 47/24

[52] U.S. Cl. ................................ 198/407; 198/468.8

[58] Field of Search ............... 198/485, 409, 412, 416, 198/407, 406, 448, 421, 457; 414/330, 33, 32; 271/149, 150, 129, 211, 184, 225

[56] References Cited

U.S. PATENT DOCUMENTS

| | | | |
|---|---|---|---|
| 2,180,163 | 11/1939 | Milmoe et al. | 198/485 X |
| 2,644,309 | 7/1953 | Detrez | 198/485 X |
| 3,224,761 | 12/1965 | Meyer-Jagenberg | 271/211 X |
| 3,625,336 | 12/1971 | Fuwa et al. | 198/407 |
| 4,220,241 | 9/1980 | DeGray | 414/330 X |

FOREIGN PATENT DOCUMENTS

| | | | |
|---|---|---|---|
| 583445 | 9/1933 | Fed. Rep. of Germany | 198/485 |
| 2427635 | 12/1975 | Fed. Rep. of Germany | 414/330 |
| 2826453 | 2/1979 | Fed. Rep. of Germany | 198/448 |
| 58-188205 | 11/1983 | Japan | 414/32 |
| 502182 | 3/1939 | United Kingdom | 198/485 |
| 882891 | 11/1981 | U.S.S.R. | 198/416 |

*Primary Examiner*—Joseph E. Valenza
*Assistant Examiner*—Jonathan D. Holmes
*Attorney, Agent, or Firm*—Joan H. Pauly

[57] ABSTRACT

A first conveyor belt (4) leads to a further processing apparatus of books or book blanks, such as a packing machine or a three-way trimmer and cover binding line. A second intermittently operated conveyor belt (2) runs perpendicularly to the first conveyor belt (4). The second conveyor belt (2) is mounted below the plane of the first conveyor belt (4) by at least the width of the books. Provided at the terminal end of the second conveyor belt (2) is a vertically displaceable hoist (10) which engages below the bound side edge of a book or book blank. At the top of the climb path of the hoist (10) is a feed gap formed between a rotatable feed roll (12) and a guide (11), wherein a book forced by the guide (11) falls down on top of the feed roll (12). The rotating feed roll (12) forwards a book onto the first conveyor belt (4). An air cushion is preferably provided between the book and the top surface of the first conveyor belt (4).

20 Claims, 1 Drawing Figure

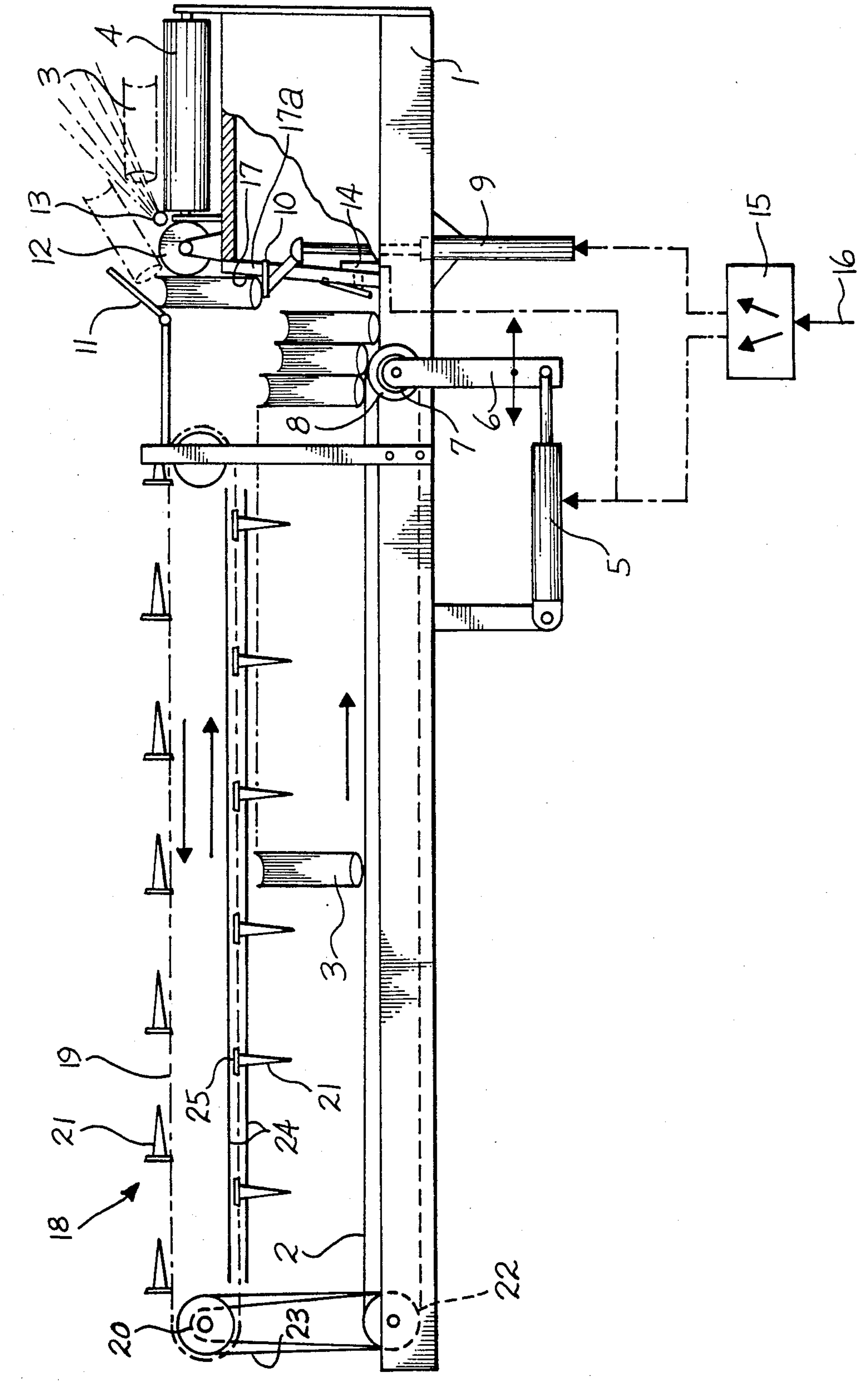
1
2
3
4
5
6
7
8
9
10
11
12
13
14
15
16
17
17a
18
19
20
21
22
23
24
25

FEEDING ASSEMBLY FOR FEEDING BOOKS OR BOOK BLANKS AT REGULAR INTERVALS ONTO A CONVEYOR BELT

The present invention relates to a feeding assembly for supplying books or book blanks at regular intervals onto a first conveyor belt leading to a further processing apparatus of books or book blanks, such as a packing machine or a three-way trimmer and binding line for book blanks, said assembly comprising a second conveyor belt perpendicular to the first belt.

When feeding bound but untrimmed and coverless book blanks to a three-way trimmer and cover binding line by using the prior art feeding mechanisms, the book blanks are piled up on top of each other and the bottom book blank is always forced by means of a pusher on top of a conveyor belt. Thus, the pile of book blanks may not be very high, so that the friction caused by its weight would not increase unreasonably. In spite of this, damages of book blanks occur as the topmost leaves tend to crumple under the action of frictional forces. Also, when forwarding covered and bound books out of a pile e.g. to a packing machine, scratching of the covers occurs as a result of the friction caused by the weight of a pile of books.

An object of the invention is to provide a feeding assembly or mechanism which overcomes the above damaging problems and in which substantial quantities of books can be loaded without affecting operation of the assembly.

This object is achieved by means of a feeding assembly according to the invention on the basis of the inventional characteristics set forth in the annexed claims.

One embodiment of the invention will now be described with reference made to the accompanying drawing which diagrammatically shows a feeding assembly of the invention in side view.

Designated at 4 is a first conveyor belt which travels in the direction perpendicular to the plane of the drawing and proceeds to an apparatus, not shown in the drawing, for further processing books or book blanks. Such a further processing apparatus may comprise a three-way trimmer and cover binding line for book blanks or a packing machine for finished books.

The feeding assembly comprises a second conveyor belt 2 which is perpendicular to said first conveyor belt 4. Said second conveyor belt 2 is located below the level of first conveyor belt 4 at least by the width of books 3. Books 3 are loaded on conveyor belt 2 with the bound back downwards. Conveyor belt 2 extends at a small, e.g. 5° angle relative to the horizontal plane in a manner that the end of said belt lies lower than its outset. Hence, books 3 stay in a forwardly inclined position and do not fall backwards upon belt 2. The only factor limiting the quantity of books loaded in the feeding assembly at one time is the length of belt 2, which can be chosen according to an application and need.

For intermittent feed of belt 2 there is a pneumatic piston-cylinder unit 5 adapted to reciprocally pivot an arm 6 which is connected to a drive gear or roll 8 of belt 2 through a dummy coupling 7. When turning in one direction, said arm 6 brings roll 8 along through the action of coupling 7 but in the other direction, said arm 6 is allowed to turn freely.

The end of conveyor belt 2 is provided with an impact wall 17 which the books 3 forwardly by belt 2 run into. The lower edge of wall 17 is fitted with a limit switch 14 for stopping the feed-directed movement of cylinder 5 as soon as the leading book hits said wall 17. After this, cylinder 5 effects automatically a return stroke for another forward stroke.

Impact wall 17 is provided with vertical slots **17*a* through which protrude the brackets of a hoist 10, said brackets engaging below the bound back of a book or book blank. A pneumatic cylinder 9 operates said hoist 10 which pushes a book or book blank toward the top of a climb path provided with a feed gap formed between a rotatable feed roller 12 and a guide 11, wherein a book forced by guide 11 falls down on top of feed roller 12. The rotating feed roller 12 transfers a book onto belt 4. In order to have a book slide undamaged onto belt 4, between feed roller 12 and the edge of belt 4 is provided a compressed air line 13 whose nozzle orifices are directed upwards or obliquely upwards so as to produce an air cushion between the top surface of belt 4 and a book 3** to be forwarded.

It should be appreciated that book 3 need not at any time be removed from under the weight of a pile of books. Impact wall 17 is positioned to produce an angle of more than 90° with the plane of belt 2, whereby a gap between a stopped book and impact wall 17 grows larger in the climbing direction. On the other hand, the movement of hoist 10 proceeds vertically with a consequence that hoist 10 will protrude further and further out of the slots **17*a* in impact wall 17** as the lift movement proceeds upwards.

In a preferred embodiment of the invention, two parallel feeding assemblies are each adapted to simultaneously feed a book forward at every other impulse issued by a further processing apparatus. Thus, the impulses received from a further processing apparatus along a line 16 are distributed by an impulse distributor 15 in a manner that every other impulse sets off the lift movement of cylinder 9 and every other impulse sets off the feed movement of cylinder 5. Thus, two parallel runs operate to feed two books forward by two control impulses.

When feeding unbound books whose binding cover is wider than the rest of the book, the book blanks tend to fall forward at the outset of a feeding line. In order to prevent this and to ensure flawless feeding, there is fitted above conveyor belt 2 an endless line comprised of a chain 19 and catches 21 pivotably mounted thereon. The turning roll 22 of belt 2 drives chain 19 by way of a chain or belt 23 which rotates an idler wheel 20 so that the lower run of line 18 travels at the same rate of speed and in the same direction as the upper run of belt 2. Along the lower run of line 18 pivoting of catches 21 is prevented by fixed guide rails 24 between which the base portions 25 of catches 21 are sliding.

I claim:

1. A feeding assembly for feeding books or book blanks at regular intervals onto a first conveyor belt leading to a further processing apparatus of books or book blanks, such as a packing machine or a three-way trimmer and cover binding line of book blanks, said assembly comprising a second intermittently operated conveyor belt perpendicular to the first conveyor belt, characterized in that said second conveyor belt (2) is located below the level of said first conveyor belt (4) by at least the width of said books (3); a vertically displaceable hoist (10) engageable below the bound side edge of a book or book blank and positioned at the terminal end of said second conveyor belt (2); a guide (11) at the top of the climb path of said hoist (10); and a feed roller (12)

located adjacent to a side edge of said first belt (4) and rotatable about an axis parallel to the conveying direction of said first belt (4); said guide (11) and said roller (12) being positioned to define a feed gap therebetween and to cause a book raised by said hoist (10) to fall down on top of said roller (12) and be transferred by said roller (12) directly onto said first belt (4).

2. A feeding assembly as set forth in claim 1, characterized in that provided between said feed roller (12) and said side edge of said first conveyor belt (4) is a compressed air pipe (13) having nozzle orifices directed generally upwards to produce an air cushion between the top surface of said first conveyor belt (4) and a book (3) being transferred by said feed roller (12) to facilitate transfer of and prevent damage to said book (3).

3. A feeding assembly as set forth in claim 1 or claim 2, further comprising a drive roll (8) for driving said second conveyor belt (2); a piston-cylinder unit 5 for operating said drive roll (8); and a lever arm (6) having a first end which is engaged by said piston-cylinder unit (5) and a second opposite end which is connected through a dummy coupling (7) to said drive roll (8) in a manner that said arm (6) is freely pivotable in one direction but, when pivoted in the other direction, said arm (6) turns said drive roll (8) therealong.

4. A feeding assembly as set forth in claim 1 or claim 2, further comprising an impact wall (17) set up downstream of the terminal end of said second conveyor belt (2) and positioned to be hit by the leading book (3) of a group of books being conveyed by said second belt (2), said wall (17) forming an angle of more then 90° with the plane of the top surface of said second conveyor belt (2).

5. A feeding assembly as set forth in claim 4, characterized in that said impact wall (17) at the terminal end of said second conveyor belt (2) is provided with a limit switch (14) for stopping the forward feed of said second conveyor belt (2) as soon as a book (3) bumps against said wall (17).

6. A feeding assembly as set forth in claim 5, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

7. A feeding assembly as set forth in claim 4, characterized in that the plane of the top surface of said second conveyor belt (2) is slightly inclined at an angle of about 5° relative to the horizontal plane in a manner that the terminal end of said second conveyor belt (2) lies lower than its outset.

8. A feeding assembly as set forth in claim 7, characterized in that said impact wall (17) at the terminal end of said second conveyor belt (2) is provided with a limit switch (14) for stopping the forward feed of said second conveyor belt (2) as soon as a book (3) bumps against said wall (17).

9. A feeding assembly as set forth in claim 8, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

10. A feeding assembly as set forth in claim 8, in which said hoist (10) moves vertically, said wall (17) has vertical slot means therein, and portions of said hoist (10) protrude through said slot means; wherein the more than 90° orientation of said wall (17) and the vertical movement of said hoist (10) cause said portions of said hoist (10) to protrude further and further out of said slot means as said hoist (10) moves upwardly to raise a book (3).

11. A feeding assembly as set forth in claim 7, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

12. A feeding assembly as set forth in claim 11, in which said hoist (10) moves vertically, said wall (17) has vertical slot means therein, and portions of said hoist (10) protrude through said slot means; wherein the more than 90° orientation of said wall (17) and the vertical movement of said hoist (10) cause said portions of said hoist (10) to protrude further and further out of said slot means as said hoist (10) moves upwardly to raise a book (3).

13. A feeding assembly as set forth in claim 7, in which said hoist (10) moves vertically, said wall (17) has vertical slot means therein, and portions of said hoist (10) protrude through said slot means; wherein the more than 90° orientation of said wall (17) and the vertical movement of said hoist (10) cause said portions of said hoist (10) to protrude further and further out of said slot means as said hoist (10) moves upwardly to raise a book (3).

14. A feeding assembly as set forth in claim 4, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

15. A feeding assembly as set forth in claim 4, in which said hoist (10) moves vertically, said wall (17) has vertical slot means therein, and portions of said hoist (10) protrude through said slot means; wherein the more than 90° orientation of said wall (17) and the vertical movement of said hoist (10) cause said portions of said hoist (10) to protrude further and further out of said slot means as said hoist (10) moves upwardly to raise a book (3).

16. A feeding assembly as set forth in claim 1 or claim 2, characterized in that the plane of the top surface of said second conveyor belt (2) is slightly inclined at an angle of about 5° relative to the horizontal plane in a manner that the terminal end of said second conveyor belt (2) lies lower than its outset.

17. A feeding assembly as set forth in claim 16, characterized in that said impact wall (17) at the terminal end of said second conveyor belt (2) is provided with a limit switch (14) for stopping the forward feed of said second conveyor belt (2) as soon as a book (3) bumps against said wall (17).

18. A feeding assembly as set forth in claim 17, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

19. A feeding assembly as set forth in claim 16, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

20. A feeding assembly as set forth in claim 1 or claim 2, characterized in that fitted above and substantially parallel to said second conveyor belt (2) is an endless line (18,19) which is driven in a manner that the lower run of said line (18,19) travels at the same rate of speed and in the same direction as the upper run of said second belt (2), said line (18,19) being fitted with a plurality of catches (21) which along the lower run of said line (18,19) are kept in a downwardly pointed position so that they extend in between the books or book blanks to be fed forward.

* * * * *